US009210914B2

(12) United States Patent
McCabe et al.

(10) Patent No.: US 9,210,914 B2
(45) Date of Patent: Dec. 15, 2015

(54) METHOD FOR TRAINING HONEYBEES TO RESPOND TO OLFACTORY STIMULI AND ENHANCEMENT OF MEMORY RETENTION THEREIN

(75) Inventors: Kirsten J. McCabe, White Rock, NM (US); Robert M. Wingo, Los Alamos, NM (US); Timothy K. Haarmann, Jemenz Pueblo, NM (US); Andrew Sutherland, Davis, CA (US); Walter D. Gubler, Davis, CA (US)

(73) Assignee: LOS ALAMOS NATIONAL SECURITY, LLC, Los Alamos, NM (US)

( * ) Notice: Subject to any disclaimer, the term of this patent is extended or adjusted under 35 U.S.C. 154(b) by 925 days.

(21) Appl. No.: 13/439,825

(22) Filed: Apr. 4, 2012

(65) Prior Publication Data
US 2012/0264353 A1     Oct. 18, 2012

Related U.S. Application Data

(60) Provisional application No. 61/471,578, filed on Apr. 4, 2011.

(51) Int. Cl.
    *A01K 51/00*     (2006.01)
    *A01K 55/00*     (2006.01)

(52) U.S. Cl.
    CPC .............. *A01K 51/00* (2013.01); *A01K 55/00* (2013.01)

(58) Field of Classification Search
    CPC .............................. A01K 47/00; A01K 51/00
    USPC ............................................ 449/1, 2; 119/6.5
    See application file for complete search history.

(56) References Cited

U.S. PATENT DOCUMENTS

| 6,896,579 | B2* | 5/2005 | Bromenshenk et al. | 449/2 |
| 6,919,202 | B2* | 7/2005 | Lewis et al. | 435/287.1 |
| 2005/0009444 | A1 | 1/2005 | Davis et al. | |
| 2005/0095954 | A1* | 5/2005 | Castillo | 449/2 |

OTHER PUBLICATIONS

Bitterman, M.E. et al.—"Classical Conditioning of Proboscis Extension in Honeybees (*Apis mellifer*)"—Jour. of Comparative Psychology, vol. 97, No. 2, 1983, pp. 107-119.
Giurfa, M. et al.—"Associative Mechanosensory Conditioning of the Proboscis Extension Reflex in Honeybees"—Learning & Memory, vol. 11, 2004, pp. 294-302.
Pelz, C. et al.—"Odorant Intensity as a Determinant for Olfactory Conditioning in Honeybees: Roles in Discrimination, Overshadowing and Memory Consolidation"—Jour. of Experimental Biology, vol. 200, 1997, pp. 837-847.

(Continued)

*Primary Examiner* — Rob Swiatek
(74) *Attorney, Agent, or Firm* — John P. O'Banion

(57) ABSTRACT

A specialized conditioning protocol for honeybees that is designed for use within a complex agricultural ecosystem. This method ensures that the conditioned bees will be less likely to exhibit a conditioned response to uninfected plants, a false positive response that would render such a biological sensor unreliable for agricultural decision support. Also described is a superboosting training regime that allows training without the aid of expensive equipment and protocols for training in out in the field. Also described is a memory enhancing cocktail that aids in long term memory retention of a vapor signature. This allows the bees to be used in the field for longer durations and with fewer bees trained overall.

20 Claims, 2 Drawing Sheets

(56) References Cited

OTHER PUBLICATIONS

Friedrich, A. et al.—"Learning at Different Satiation Levels Reveals Parallel Functions for the cAMP-Protein Kinase a Cascade in Formation of Long-Term Memory"—The Jour. of Neuroscience, vol. 24, No. 18, May 5, 2004, pp. 4460-4468.

Sandoz, J.C. et al.—"Asymmetrical generalisation between pheromonal and floral odours in appetitive olfactory conditioning of the honey bee (Apis mellifera L.)"—Jour. Comp. Physiol. A., vol. 187, 2001, pp. 559-568.

Ray, S. et al.—"Behavioral Development and Olfactory Learning in the Honeybee (Apis mellifera)"—Dev. Psychobiol., vol. 34, No. 1, Jan. 1999, pp. 21-27.

Abramson, Charles I. et al.—"Learning in the Africanized Honey Bee: Apis mellifera L."—Physiology & Behavior, vol. 62, No. 3, 1997, pp. 657-674.

Kretschmar, J.A. et al.—"Caffeine in Citrus flowers"—Phytochemistry, vol. 52, 1999, pp. 19-23.

Barron, A.B. et al.—"Selective modulation of task performance by octopamine in honey bee (Apis mellifera) division of labour"—Jour. Comp. Physiol. A, vol. 191, 2005, pp. 659-668.

\* cited by examiner

METHOD FOR TRAINING HONEYBEES TO RESPOND TO OLFACTORY STIMULI AND ENHANCEMENT OF MEMORY RETENTION THEREIN

CROSS-REFERENCE TO RELATED APPLICATIONS

This application claims priority from U.S. provisional patent application Ser. No. 61/471,578 filed on Apr. 4, 2011, incorporated herein by reference in its entirety.

STATEMENT REGARDING FEDERALLY SPONSORED RESEARCH OR DEVELOPMENT

This invention was made with Government support under Grant No. DE-AC52-06NA25396, awarded by the Department of Energy. The Government has certain rights in the invention.

INCORPORATION-BY-REFERENCE OF MATERIAL SUBMITTED ON A COMPACT DISC

Not Applicable

BACKGROUND OF THE INVENTION

1. Field of the Invention

This invention pertains to biological sensors and chemical detection methods, and more particularly to a protocol for conditioning honeybees to olfactory stimuli to aid biological sensor detection of agricultural plant pathogens. This invention also pertains to a memory enhancing cocktail that aids in long term memory retention of a vapor signature, thereby allowing the bees to be used in the field for longer durations and with fewer bees trained overall.

2. Description of Related Art

The presence of volatile and semi-volatile organic compounds (VOV/SVOC) can be a powerful diagnostic indicator in a variety of commercial applications including transportation security, search and rescue, narcotics interdiction, medical diagnostics, food quality and control, and facility security.

The detection of volatiles and semi-volatiles may be accomplished in the field with portable instruments, or in the laboratory with previously collected samples. Typically, chromatographic separations are performed by gas chromatography for identification. Some other technologies exist such as ion mobility spectrometry that can characterize some volatiles and semi-volatile organic compounds. These instruments and methods are both quantitative and qualitative in nature and can be costly to perform.

Non-instrument based detection methods in the art are primarily mammalian based systems. For example, canines are used extensively in smuggling interdiction, explosives detection, search and rescue, etc. where the plume of a volatile or semi-volatile set of chemicals is detected by a trained canine. Additionally, there are indicator papers that can change color when reacted with some analytes. The number of analytes that are detectable by this approach is very limited.

However, detection of volatile organic compounds in an agricultural setting can be complicated and many current methods may not be easily adapted to that setting. The agroecosystem is a complex biological arena, far from the sterile environment of a laboratory or the controlled environment of an international airport. Therefore, sensors for use in this system must be modified from that employed for sensors of explosives at national ports of entry, for example. Rather, a strong and ubiquitous background of volatile and semi-volatile organic compounds is present in a natural or agricultural setting, such as a commercial wine grape vineyard, that is often quite similar to the target volatile compound. For example, plants infected with pathogens or attacked by insects may release specific volatile organic compounds in response, but sometimes the volatile compounds that are indicative of such invasion may also be released from healthy, uninfected plants. The key difference may lie in amounts and/or ratios (to each other) of the volatile organic compounds that are released.

Accordingly, there is a need for inexpensive and accurate qualitative sensors for in situ detection of agricultural plant pathogens, thereby indicating disease. Such sensors will provide decision support for disease management, and potentially reduce the economic and environmental impact of remedial disease control measures. The present invention satisfies this need, as well as others, and is generally an improvement over sensors in the art.

BRIEF SUMMARY OF THE INVENTION

The impact of the early detection of agricultural infestations is significant and could result in millions of dollars in savings as well as increased production of high value crops within the agricultural community each year. The present invention generally involves training honeybees to respond to the vapor signatures of agricultural infestations through associative conditioning. The olfactory abilities of insects have been harnessed for use in detecting the presence of volatile or semi-volatile chemicals by monitoring a trained behavior exhibited by the insect in response to sensing the presence of the volatile or semi-volatile chemical.

For example, domestic honeybees, *Apis mellifera*, have olfactory senses comparable to those of dogs and are capable of detecting specific volatile organic compounds (VOC) within a carrier gas in the low parts per billion. Honeybees are preferably utilized for vapor detection of biologically relevant chemicals by monitoring their Proboscis Extension Reflex (PER), an unambiguous, innate response in bees to antennal stimulation (contact) with sucrose. Bees, for example, will reflexively extend their proboscis when a sucrose or other sugar solution is applied to the antennae. The proboscis extension reflex is part of the natural feeding behavior of the bee that naturally associates the odor of a flower with food.

If the bee is exposed to an odor immediately before the application of the sugar solution to the antennae, it forms an association with the odor and the sugar reward. This is a case of classic conditioning where the introduced odor is viewed as a conditioned stimulus (CS) and the reinforcing sucrose sugar solution is viewed as the unconditioned stimulus (US) and the observed (PER) is viewed as the conditioned response (CR). The association is confirmed when the conditioned response (PER) is seen with exposure to the conditioned stimulus (odor) in the absence of the unconditioned stimulus (sucrose). Therefore, the trained bee will extend its proboscis (CR) in response to a specific odor (CS) regardless of whether a sugar solution (US) is thereafter applied to the antennae.

Variations of classical conditioning such as trace conditioning can also be used. Unlike classical or classical delay conditioning where the (CS) and the (US) overlap, there is a stimulus free gap between the application of the conditioned stimulus (odor) and the application of the unconditioned stimulus (sucrose). The gap must be bridged to form the association and therefore different areas of the brain may be involved with trace conditioning than are used in classical conditioning.

In honeybees, the proboscis extension response (PER) can often be conditioned by associating an odor stimulus (CS) to a sucrose reward (US) after a single CS-US exposure. However, one drawback is that the CS-US associations may fade or disappear over time. One general characteristic of this associative learning phenomenon in insects is that that acquired conditioned responses can be lost after repeated exposures of the conditioned stimulus (odor) without the unconditioned stimulus (sucrose) in a process called extinction. Extinction may be due to either a disruption of the "CS-US reward" association or the creation of a negative "CS-no reward" association that is stronger than the initial CS-US association.

To improve the longevity of the conditioning, a cocktail for enhancing memory in honeybees undergoing conditioning may be added to sugar water reward and pre-training food of the bees undergoing conditioning. The additive is preferably a biochemical supplement selected from the group consisting of caffeine, juvenile hormone III, octopamine, protein kinase A (PKA), protein kinase C (PKC), cyclic adenosine monophosphate (cAMP), cAMP response element-binding protein (CREB), nitric oxide and nicotine. These supplements have been shown to improve the learning and longevity of the CS-US association. In one embodiment, several supplements from the group are combined with the sugar reward.

Furthermore, it has been discovered that glucose rewards during the conditioning procedure improves learning and memory relative to sucrose which is principally used and described in literature. Glucose is therefore preferred as the unconditioned stimulus (US) in the pre-training and conditioning schemes of the present invention.

This specialized conditioning protocol is also designed for use in a complex agricultural ecosystem that has a variety of volatile organic compounds that may be similar to the target compounds. Honeybees are exposed to the olfactory stimulus/stimuli of interest, such as compounds emanating from a host-specific plant pathogen infection, within a carrier gas containing compounds from uninfected healthy host plants and/or nonspecific plants. The methods ensure that the conditioned bees will be less likely to exhibit a conditioned response to uninfected plants or environment, a false positive response that would render such a biological sensor unreliable for agricultural decision support. Classical conditioning of honeybees, whether for research or for biological sensor development, has previously only involved presentation of the target stimulus within a carrier gas of ambient air. This new approach improves upon convention by providing a more accurate conditioning background.

Studies have shown that bees can be conditioned to exhibit (PER) in response to sensing a specific volatile or semi-volatile chemical that are both related or unrelated to natural foraging. This "yes/no" detection signal can be integrated into a platform interfacing biological responses (PER) with electronics along with wireless data transmission allowing remote searching of agricultural or natural environments for infestations and diseases.

Typically, the (PER) conditioned response is monitored directly by experimental personnel. However, in some applications for vapor detection it is advantageous to have the detectors (honeybees) in a system that removes the honeybee from experiencing other stimuli (visual, mechanical) and yet still allow for monitoring of the (PER) in response to exposure of the bee to a specific vapor. This approach would also incorporate the benefits of having a detection system which works outside of the laboratory.

The "Superboosting" training and reinforcing regime also allows training without the aid of expensive equipment and protocols for training out in the field. The memory enhancing cocktail aids in long term memory retention of the vapor signature. This allows the bees to be used in the field for longer durations and with fewer bees needing to be trained overall.

Accordingly, an aspect of the invention is to develop conditioned PER in honeybees into an agricultural decision support device, specifically identifying agricultural plant pathogens at low densities and/or seasonally early in valuable commodity systems in order to reduce economic and environmental costs due to unnecessary fungicide applications.

A further aspect of the invention is to provide a table top "Superboost" training regimen to produce conditioned/trained honeybees to be used as detectors for volatiles and semi-volatiles. This methodology has been developed for more rapid associative learning (training) and reinforcement relative to methodologies described in current literature.

Another aspect of the invention is to provide a novel methodology that applies "memory-supplements" for more long lasting associative learning as applied to detection of volatiles and semi-volatiles via PER monitoring.

Lastly, combinations of the methodologies produce a robust and sensitive system for qualitative detection of volatiles and semi-volatiles that is comparable to, if not better than, current instrumental techniques or mammalian-based methods (canines).

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only.

DETAILED DESCRIPTION OF THE INVENTION

Figure 1:
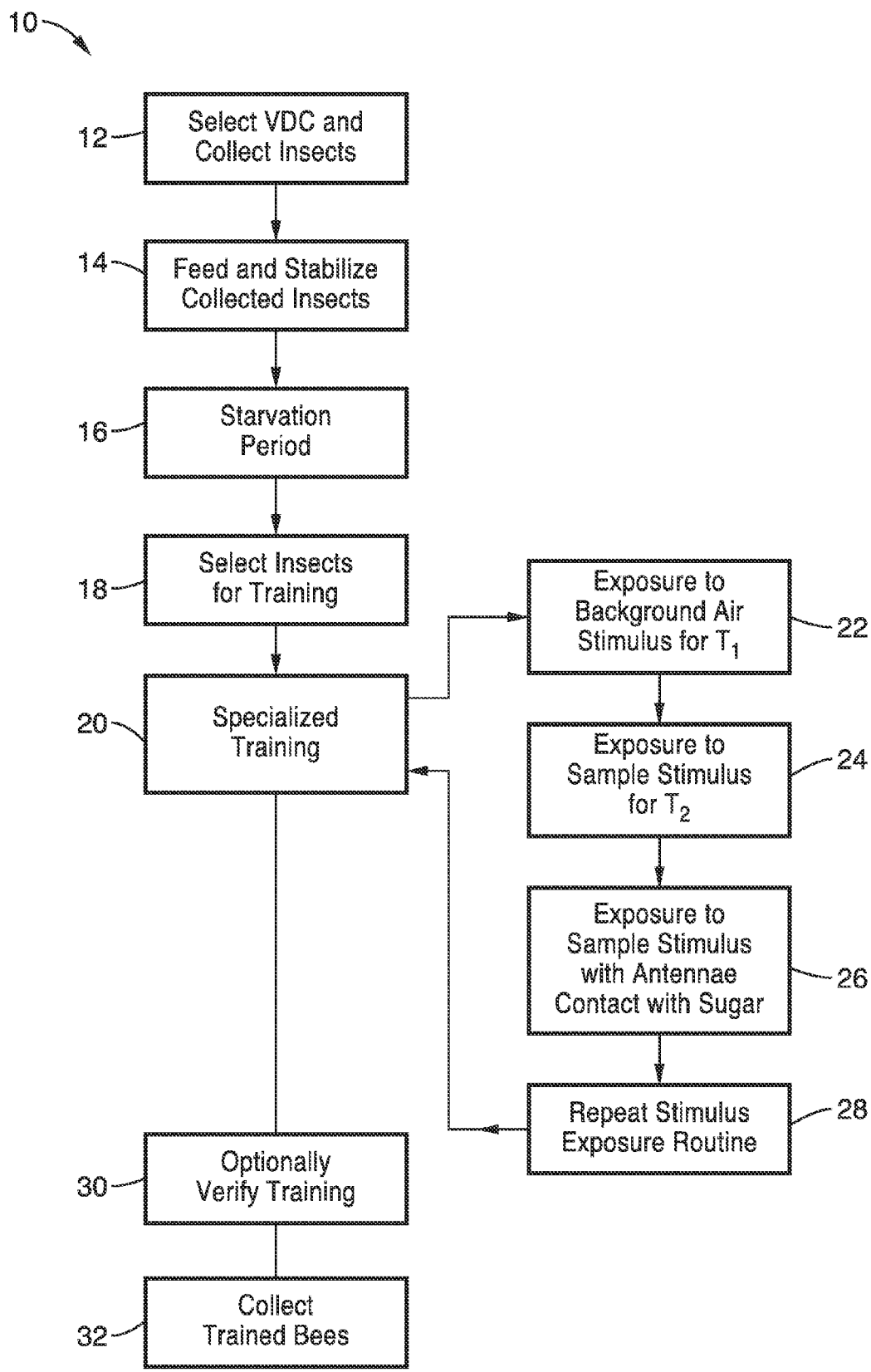
FIG. 1 is a flow diagram of a method for training honeybees to detect agricultural infestations.
Figure 2:
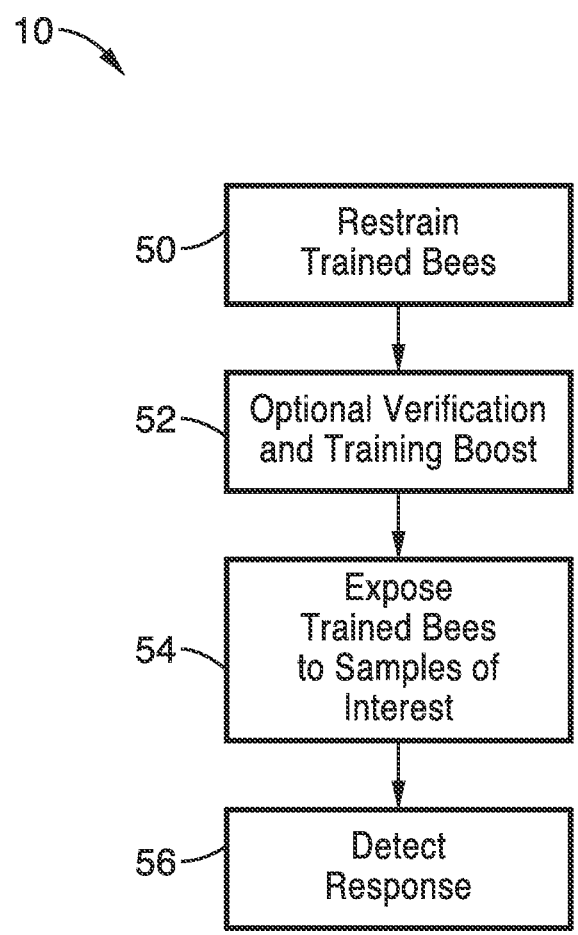
FIG. 2 is a flow diagram of a method for using trained insects as biological sensors for specific volatile or semi-volatile organic compounds.

Referring more specifically to the drawings, for illustrative purposes the present invention is embodied in the system and methods generally illustrated in FIG. 1 through FIG. 2. It will be appreciated that the methods may vary as to the specific steps and sequence and the system architecture may vary as to structural details, without departing from the basic concepts as disclosed herein. The method steps are merely exemplary of the order that these steps may occur. The steps may occur in any order that is desired, such that it still performs the goals of the claimed invention.

Turning now to FIG. 1, an embodiment of a method 10 for producing and using biological based sensors for detecting volatile and semi-volatile organic compounds is schematically shown. The present invention relates to systems and methods for the production of inexpensive, sensitive biological sensors that are particularly suited for use in a natural or agricultural setting.

The conditioning protocol of the embodiment of FIG. 1 illustrates the development of honeybees as biological sensors for in situ detection of agricultural plant pathogens. Commercial plant protection companies, crop advisers, and individual growers, as well as the general public, may all benefit from the system. Although honeybees are used to illustrate the invention, other organisms with superior sensory abilities can be developed into biological sensors by utilizing innate (or learned) unambiguous responses or processes as indicators of the presence of specific compounds or (phenological) situations of human interest. This is generally accomplished through classical conditioning, where an unconditioned stimulus (US), such as food, that elicits an unconditioned response (UR), is spatiotemporally coupled with a novel conditioned stimulus (CS). In time, the organism exhibits the unconditioned response when presented with the conditioned stimulus in anticipation of the unconditioned stimulus. In this way, the (UR) becomes a conditioned response (CR), indicative of the presence of the conditioned stimulus (CS).

However, environmental air may include both volatile compounds released from plants infected with pathogens or attacked by insects and volatile compounds released from healthy, uninfected plants. Since uninfected and infected leaves share many of the same volatile organic compounds they may have overlapping signatures and it is likely that bees trained using conventional methods in ambient air will exhibit a conditioned response to uninfected plants in an agricultural ecosystem, representing a false positive response.

In other words, if honeybees are trained to respond to pathogen-infected leaves, it is possible that they would also respond similarly to uninfected leaves, thereby exhibiting a false positive response. Sensitivity of the insect sensors may lie in the trained ability to detect small variations and amounts of volatile organic compounds that are released and/or the ratios of the normal to pathogen released compounds. For this reason, the methods are designed with a specific training/conditioning protocol to minimize this lack of successful discrimination. Conditioning for detection of pathogen-infected plants preferably utilizes a background carrier gas that mimics conditions found in the intended agricultural venue. In one embodiment, a stimulus delivery system is used that incorporates a constant background carrier gas consisting of the headspace captured from uninfected leaves.

The conditioning protocol of the system 10 of FIG. 1 begins at block 12 with the selection and collection of insects for use as biological sensors. Here, biological sensing of plant pathogens is accomplished by training honeybees to associate an olfactory stimulus emanating from a plant infection or from a plant pathogen. The selection of the volatile or semi-volatile organic compound stimulus in this illustration will be determined by the plant pathogen or pest and the type of plants that are involved. For example, the scent of the grapevine powdery mildew fungus is detectable by the human nose and, therefore, by other olfactory systems like that of honeybees. Other fungi such as *Botrytis cinerea*, that causes grape bunch rot, has a distinct VOC/SVOC aroma. Strawberry powdery mildew is caused by *Sphaerotheca macularis f.* Ergosterol is yet another VOC/SVOC indicative of grapevine fungus infestation. All these examples serve to show that VOC/SVOC emissions due to agricultural infestations are measureable or identifiable and therefore likely candidates for detection via associatively conditioned honeybees.

Foraging bees can be collected as they return to the hive using a vacuum device and facilitated by a hive reducer. At block 14 of FIG. 1, the collected bees are then preferably transferred to an odor-resistant community domicile and given access to food (mixture of honey and powdered sugar and water) for approximately five hours. The bees may also be cooled. This will calm and stabilize the bees. In one embodiment at least one biochemical supplement is added to the food.

Food is then removed from domicile at block 16 of FIG. 1 and the bees are starved for a period of time, typically overnight for approximately 14 hours. The duration of this starvation period may vary depending on the type of insect that is used.

The suitability of the collected bees for training is then evaluated at block 18. Individual starved bees are removed from the domicile and restrained within polycarbonate tubes with only their heads and antennae exposed. The bees are optionally assigned a subject identification number. In one embodiment, the bees are marked with a permanent identifier to indicate collection and the nature of their prior training. All of the test subjects are checked for proboscis extension reflex (PER) ability as well as innate unconditioned response (UR) to the unconditioned stimulus (US). This is usually done with antennal contact with 40% sucrose or glucose and the subject is allowed to imbibe the sugar solution for 1-2 seconds. If the individual bees fail to exhibit PER and/or imbibitions they are released back to the hive.

Training of the selected individual bees takes place at block 20 of FIG. 1 with three sub steps at blocks 22, 24 and 26 that may be repeated at block 28. At block 22, each training subject, in series, is exposed for a time $T_1$ (about 10-20 seconds) of continuous airflow, representing the background stimulus, consisting of the headspace captured from one intact uninfected leaf. The background stimulus can also be from non-targeted plants or environmental air to give context to the VOC/SVOC of interest.

At block 24, the background stimulus is followed by an exposure to a sample stimulus for a time $T_2$ (approximately six second pulse), consisting of the headspace captured from one intact infected leaf.

The antenna of the bee is then contacted with a sugar solution in the presence of the sample stimulus from the infected leaf to form an association at block 26. In one embodiment, the final 1-2 seconds of sample stimulus delivery is accompanied by antennal contact with glucose or sucrose solution and subsequent allowance of glucose or sucrose imbibitions.

However, it has been observed that glucose rewards during the conditioning procedure improve learning and memory relative to sucrose, which is traditionally used as an unconditioned stimulus reward. Therefore, it is preferred that the sugar used in the training steps at block 22 through block 28 be glucose so that the association training and memory of the bees is optimized.

In addition, it has been observed that the long term memory of the bee for the training can be enhanced with certain biochemical supplements added to the sugar solution used in training and/or pre-training feedings. Improved memory and learning is shown to be enhanced by the addition of biochemical supplements of octopamine, PKA, cAMP, and others to the food of bees undergoing conditioning. Combinations of two or more from the group of Juvenile Hormone III, octopamine, PKA, PKC, cAMP, CREB, Nitric oxide, and Nicotine with glucose or sucrose are particularly effective. The mixture of supplements with the approximately 40% sugar water may be fed to the bees from the beginning of training until the completion of the training.

Stimulus exposure may be repeated in consecutive trials at block 28 of FIG. 1. However, it is preferred that no training subject receive the second exposure until all the training subjects have received the first exposure.

The training of the bees to detect a particular volatile or semi-volatile organic compound can be optionally verified at block 30 by exposing the bee to the stimulus of interest and observing the response of the bee. The trained bees are then collected for use in the field at block 32. The performance of the trained insects and the strength of the association and response can be very strong for several days to several weeks. Accordingly, trained bees can be kept for a period of time before being used as a sensor. The bees can also be transported to a location from a training site or can be trained in the field.

The biological detection can be part of an agricultural decision support scheme through the biological sensing of plant pathogens by training honeybees to associate an olfactory stimulus emanating from infection and the like. Referring now to FIG. 2, the trained bees can be used for in situ detection of agricultural plant pathogens as an indication of the presence of disease and potentially reducing the economic and environmental impact of control measures. Certain crop infestations have vapor plume signatures and can cause significant harm to agriculture when not identified early on in the infestation. Trained honeybees are conditioned to respond, through proboscis extension reflex, to detect the presence of the specific odor alone.

At block 50, the bees that are trained to associate a specific VOC/SVOC signature are restrained in a tube with the head and mouthparts capable of moving freely. The bees are preferably cooled to reduce their stress and activity. It can be seen that dozens of individual bees that are each trained to associate a different VOC/SVOC signature can be transported to a site of interest and provide a library of available biological detectors. In another embodiment, the local bees that are present at the site of interest are trained and used at that same location.

Optionally, at block 52 the training may be verified and reinforced or boosted for a particular volatile or semi-volatile organic compound. If the trained bees fail to stick out their tongue (PER) in anticipation of receiving a reward when exposed to the VOC, then the training of the individual bee is questioned and will not be verified. This verification process will avoid a false negative. The training of honeybees to a VOC/SVOC scent can also be boosted in the field using only a vial with the scent inside and sugar water on a cotton swab. The honeybees that are trained to detect specific VOC/SVOC materials via associative learning are exposed to the trained scent, followed by a sugar solution reward that reinforces the past training. In one embodiment, the specific VOC/SVOC scent is placed in a vial, sealed and allowed to sit for about a minute. The vial is then opened and the head of the harnessed bee is placed into the vial. After approximately 3 seconds the honeybee is rewarded with sugar water. After several bees are exposed, the vial is sealed again to allow the scent to build up again. This type of training allows the training of bees in the field to any scent that is present in a vial and unburdens the trainers from the need of large training equipment. In another embodiment, the verification and boost scheme at block 52 is used to quickly train bees that are collected in the field.

The restrained trained bee sensors that have been produced are available for use as a diagnostic sensor for the presence of specific VOC/SVOC compounds in natural or agricultural locations at block 54. The sample leaf or collection swab or other sample that has been collected from the field for testing is brought in proximity to the trained bee.

It can be seen that the main response variable of interest is binary: a positive or negative conditioned response characterized by a subject action or inaction via PER during antennal contact with the sample stimulus. Other response variables include positive or negative (binary) unconditioned response, and positive or negative (binary) premature conditioned response (action via PER prior to antennal contact with sample stimulus).

Since the system extracts detection signals from the honeybee sensors and processes that signal as a "yes/no" signal, electronic cameras, sensors and computers can be used in concert to process and record the insect responses. The test samples also have a geographical element so that the range of infection, for example, can be mapped and the location of the application of remedial measures can be specific. The detection of the response of trained bees to samples at block 56 can also include computing devices that are capable of wireless data transmission from a remote location to a central location for processing and mapping. The information from many detectors that are testing samples at specific locations can be assembled and a response such as pesticide applications can be specifically tailored and coordinated.

The invention may be better understood with reference to the accompanying examples, which are intended for purposes of illustration only and should not be construed as in any sense limiting the scope of the present invention as defined in the claims appended hereto.

EXAMPLE 1

In order to demonstrate the functionality of the general method for training insects for detection of VOC/SVOC materials shown in FIG. 1, honeybees were selected as the sensor and infected and uninfected plants were collected. The stimulus delivery system that incorporates a constant background carrier gas consisting of the headspace captured from uninfected leaves was tested.

Foraging honeybees were collected as they returned to the hive using a vacuum device and facilitated by a hive reducer. The collected bees were transferred to an odor-resistant community domicile and given access to a mixture of honey, powdered sugar and water for approximately five hours. The food was then removed from the domicile and the bees were starved overnight for approximately 14 hours.

Individual bees were then removed and restrained within polycarbonate tubes, with only heads and antennae exposed, and the bees were assigned a subject identification number.

All of the selected bees were checked for their ability for undergoing the proboscis extension reflex (PER) response. The bees were checked for innate unconditioned response to an unconditioned stimulus (antennal contact with 40% sucrose) and were then allowed to imbibe a sucrose solution for 1-2 seconds. To acclimate the bees to the airflow of the odorant delivery system, the bees were left for 20 minutes in front of a fan delivering a flow of air.

Each subject in sequence was then exposed to 10-20 seconds of continuous airflow, representing the background stimulus, consisting of the headspace captured from one intact uninfected leaf [a petiole sealed with polytetrafluoroethylene tape]. This was followed by a six second pulse of sample stimulus, consisting of the headspace captured from one intact infected leaf (petiole sealed as above). The final 1-2 seconds of sample stimulus delivery was accompanied by antennal stimulation (contact) with a sucrose solution and subsequently sucrose imbibition.

Stimulus exposure was repeated in consecutive trials so that no subject received the second exposure until all of the subjects received the first. A total of three-four conditioning trials were performed with a 15 to 25 minute gap between trials. Stimuli sources (sealed and contained intact leaves) were kept at constant temperature throughout the trials.

EXAMPLE 2

To further demonstrate the ability of bees to identify agriculturally related scents indicative of certain crop infestations that have vapor plume signatures that can cause significant harm to agriculture when not identified early on in infestation, grape fungus was selected for detection and training. Specifically, the fungus *uncinula necator* that causes powdery mildew on grapes was selected for bee detection training. This fungus is known to produce common odors such as 1-octen-3-one and (Z)-1,5-octadien-3-one.

In one embodiment of training for detection of the fungus, honeybees were trained to detect the vapor signatures of the agricultural infestation via associative conditioning. The day before each experiment, approximately 100 bees were collected at 3 pm from a colony using a modified vacuum cleaner with an insect collection tube. Foraging bees were collected from the entrance of the hive. The bees were then transferred from the collection tube into holding cages where they were fed ad libitum with a 1.8M sucrose solution. The cages were then placed in a dark cabinet at room temperature for 2 hours allowing the bees to freely feed. The sucrose was removed after approximately 2 hours and the bees were left in the cage for 15 hours until the next day when further experiments were performed.

To reduce stress on the bees and to make handling of the bees easier, the bees were immobilized prior to the experiments by cooling them in a refrigerator at a temperature of (4° C.) for 15 minutes. Thereafter, the bees were mounted in plastic holders (the size of a drinking straw) so that their antennae and mouthparts could move freely. The bees were restrained in the holder using tape.

Prior to starting the olfactory conditioning procedure, bees were screened for the ability to exhibit an unconditioned response by moving a cotton swab containing a 1.8M sucrose solution over the antennae. Bees that failed to exhibit the reflex were not used in subsequent experiments. Only bees that showed the unconditioned response (PER following the application of 1.8M sucrose solution to the antennae) were used in the training experiments.

Each conditioning trial lasted for six seconds which consisted of a vapor presentation (conditioned stimulus) with the last three seconds consisting of a sugar water reward (unconditioned stimulus). Bees that demonstrated a spontaneous response to the first presentation of the conditioned stimulus (CS) were eliminated from the experiments. A total of four conditioning trials were performed with 15 to 25 minutes inter-trial duration. The conditioned proboscis extension responses occurring within the six seconds of the stimulus delivery for the conditioning trials were rewarded and recorded. Bees were trained in the presence and absence of background scents such as flowers/plant material in which the bacteria, mold or fungus resides.

EXAMPLE 3

An alternative embodiment for training or reinforcing prior training was demonstrated. Honeybees were trained to a scent using only a vial with the scent inside and sugar water on a cotton swab. The honeybees were trained to detect semivolatiles and volatiles via associative learning. Exposure to a scent, followed by sugar solution reward, trained the bees to extend the proboscis in anticipation of receiving a reward. The proboscis extension reflex (PER) was monitored via a camera and pattern recognition software to give a readout on an associated laptop.

In this demonstration a selected scent was placed in a vial, sealed and let sit for one minute. The vial was opened and the head of the harnessed bee was inserted into the vial. After a wait of three seconds, the bee was rewarded with sugar water. This procedure was carried out for ten bees and then the vial was re-capped and the scent was allowed to build up again. This type of training allows the training of bees in the field (or on a benchtop) to any scent you have available in a vial. This superboosting technique was compared side by side against the tabletop standard training regime described above using honeybees collected from the same hive, on the same day and treated the same way in the lab using explosive VOCs (C-4, Propellant and TNT). Superboosting decreased the time needed to train the bees, yielded relatively equal positive detection response percentages on the day of training. However, positive detection response percentages were always higher in the superboosted bees versus the bees trained via the training rig methodology on Day 2 (24 hours post training). The advantages that the superboosting methodology has over the training rig methodology besides improved positive hits in the detection at 24 hours post training are decreased equipment needs, decreased set-up time, and decreased training time.

EXAMPLE 4

The promotion of long term memory enhancement of the trained response by additives to the sugar given to the bees was demonstrated. It has been observed that memory and learning by the bee is improved by adding biochemical supplements of caffeine, Juvenile Hormone III, octopamine, PKA, PKC, cAMP, CREB, Nitric oxide, Nicotine, or others to the sugarwater reward and pre-training food of honeybees undergoing conditioning. Soybean protein and nicotine were not investigated at this time due to studies indicating they may play a bigger role in short term memory versus long term memory recall.

To demonstrate the effects, 60 to 100 honeybees were collected from one hive by vacuum collection. The bees were brought back to the lab and split into three groups. One control group was fed 40% sugar water in a trough or on parafilm in cage. Food levels were monitored throughout day to ensure that the bees could get enough to eat but did not drown. The second and third experimental groups were given 40% sugar water spiked with the cocktail. All honeybees were handled the same way. The mixture was to the honeybees from the beginning of capture, through training and until the completion of the experiment.

The addition of Juvenile Hormone III via ingestion was evaluated to determine if it accelerated the ability of young bees and/or foragers to train. It was concluded that JHIII (250 mg/ml in acetone, topical administration to thorax, 3 ul)) alone does not appear to substantially increase trainability in foragers or young on linalool (young) or TNT (foragers).

Long-term memory enhancements using PKA and caffeine were also tested. Caffeine and PKA, when administered separately, increase long-term memory out to a minimum of 3 days post training. Approximately 3.9 units PKA/bee (1 µl) and 15.6 units PKA/bee (4 µl) were administered. Four µl PKA had an adverse affect on the bees causing a larger death rate at Day 3 post training and exposure. The 1 µl PKA administration showed an increase in long-term memory at the 24 hour and 48 hour mark. Caffeine at 2.5 mM showed the best improvement in long term memory recall (as compared to concentration ranging from (0-5 mM).

cAMP was also tested. 1mM cAMP was ingested by bees in a 40% sucrose solution alone did not appear to significantly increase long-term memory in honeybees trained to C-4. The combination of supplements gave the best response.

Memory "cocktails" such as combinations of 1 mM c-AMP, 2 µL PKA, 2 mg/mL octopamine improved training and retention rates for C-4 detection in conditioned honeybees compared to untreated honeybees up to a minimum of Day 2 (24 hours post exposure). The memory enhancing combinations aids in long term memory retention of the vapor signature. This longer term memory retention allows the bees to be used in the field for longer durations and reduces the overall number or trained bees that are needed for detection.

From the foregoing description, it will be appreciated that the present invention encompasses various inventive embodiments, which include but are not limited to the following:

1. A method for detecting agricultural volatile and semi-volatile organic compounds, the method comprising: (a) training bees to exhibit a proboscis extension response when exposed to a selected volatile or semi-volatile organic compound (VOC/SVOC), the training comprising: exposing a bee to background air; exposing the bee to the selected (VOC/SVOC); and exposing the bee to the selected (VOC/SVOC) while stimulating an antennae of the bee with a sugar solution to produce a trained bee; (b) exposing the trained bee to a sample; and (c) observing a response of the trained bee to the exposure of the sample; (d) wherein the presence of the selected (VOC/SVOC) from the sample will cause the trained bee to exhibit a proboscis extension response.

2. The method of embodiment 1, wherein the sugar solution comprises glucose and water.

3. The method of embodiment 2, wherein the sugar solution further comprises a biochemical supplement selected from the group consisting of: caffeine, Juvenile Hormone III, octopamine, PKA, PKC, cAMP, CREB, Nitric oxide, and Nicotine.

4. The method of embodiment 1, wherein the background air comprises a carrier gas containing compounds from non-specific plants.

5. The method of embodiment 1: wherein the background air comprises a carrier gas containing compounds from a healthy sample plant; and wherein the sample comprises a potentially infected sample plant.

6. The method of embodiment 1, further comprising: feeding a bee a pre-training solution of water, a sugar and a biochemical supplement selected from the group consisting of: caffeine, Juvenile Hormone III, octopamine, PKA, PKC, cAMP, CREB, Nitric oxide, and Nicotine.

7. The method of embodiment 6, wherein the biochemical supplement comprises a combination of at least two supplements selected from the group of supplements consisting of: caffeine, Juvenile Hormone III, octopamine, PKA, PKC, cAMP, CREB, Nitric oxide, and Nicotine.

8. The method of embodiment 1, further comprising: verifying the training of the trained bee by exposing the bee to the selected (VOC/SVOC).

9. The method of embodiment 1, further comprising: verifying the training of the trained bee by exposing the bee to the selected (VOC/SVOC); and reinforcing the training of the bee by administering a sugar reward.

10. A method of conditioning honeybees to respond to olfactory stimulus of interest, comprising: collecting bees for conditioning; feeding the collected bees a solution of water, sugar and a biochemical supplement selected from the group consisting of: caffeine, Juvenile Hormone III, octopamine, PKA, PKC, cAMP, CREB, Nitric oxide, and Nicotine; starving the bee; exposing the bees to an olfactory stimulus of interest; and applying a sugar solution to at least one antennae of the bee during exposure of the bee to the olfactory stimulus of interest; wherein the bee associates the olfactory stimulus of interest with the application of sugar reward and exhibits a proboscis extension response when exposed to the olfactory stimulus of interest.

11. The method of embodiment 10, wherein the sugar comprises glucose and the sugar solution comprises glucose and water.

12. The method of embodiment 11, wherein the sugar solution further comprises a biochemical supplement selected from the group consisting of: caffeine, Juvenile Hormone III, octopamine, PKA, PKC, cAMP, CREB, Nitric oxide, and Nicotine.

13. The method of embodiment 10, wherein the biochemical supplement comprises a combination of at least two supplements selected from the group of supplements consisting of: caffeine, Juvenile Hormone III, octopamine, PKA, PKC, cAMP, CREB, Nitric oxide, and Nicotine.

14. The method of embodiment 10, further comprising: repeating the exposure of the bees to an olfactory stimulus of interest and the application of a sugar solution to at least one antennae of the bee during exposure of the bee to the olfactory stimulus of interest steps more than one time.

15. The method of embodiment 10, further comprising: exposing the honeybees to compounds emanating from a host-specific plant pathogen infection olfactory stimulus of interest within a carrier gas containing compounds from a uninfected (healthy) host plant.

16. The method of embodiment 10, further comprising: verifying the training of the trained bee by exposing the bee to the selected olfactory stimulus of interest.

17. The method of embodiment 10, further comprising: verifying the training of the trained bee by exposing the bee to the selected olfactory stimulus of interest; and reinforcing the training of the bee by administering a sugar reward.

18. A method for detecting agricultural volatile and semi-volatile organic compounds, the method comprising: (a) training bees to exhibit a proboscis extension response when exposed to a selected volatile or semi-volatile organic compound (VOC/SVOC), the training comprising: feeding collected bees a solution of water, glucose and a biochemical supplement selected from the group consisting of: caffeine, Juvenile Hormone III, octopamine, PKA, PKC, cAMP, CREB, Nitric oxide, and Nicotine; exposing a bee to background air; exposing the bee to the selected (VOC/SVOC); and exposing the bee to said selected (VOC/SVOC) while stimulating an antennae of the bee with a solution of water, glucose and a biochemical supplement selected from the group consisting of: caffeine, Juvenile Hormone III, octopamine, PKA, PKC, cAMP, CREB, Nitric oxide, and Nicotine to produce a trained bee; (b) exposing the trained bee to a sample; and (c) observing a response of the trained bee to the exposure of the sample; (d) wherein the presence of the selected (VOC/SVOC) from the sample will cause the trained bee to exhibit a proboscis extension response.

19. The method of embodiment 18, wherein the background air comprises compounds emanating from a host-specific plant pathogen infection, within a carrier gas containing compounds from healthy nonspecific plants.

20. The method of embodiment 18, wherein the biochemical supplement comprises a combination of at least two supplements selected from the group of supplements consisting of: caffeine, Juvenile Hormone III, octopamine, PKA, PKC, cAMP, CREB, Nitric oxide, and Nicotine.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

We claim:
1. A method for detecting agricultural volatile and semi-volatile organic compounds, the method comprising:
   (a) training bees to exhibit a proboscis extension response when exposed to a selected volatile or semi-volatile organic compound (VOC/SVOC), the training comprising:
      exposing a bee to background air;
      exposing the bee to the selected VOC/SVOC; and
      exposing the bee to said selected VOC/SVOC while stimulating an antennae of the bee with a sugar solution to produce a trained bee;
   (b) exposing the trained bee to a sample; and
   (c) observing a response of the trained bee to the exposure of the sample;
   (d) wherein the presence of the selected VOC/SVOC from the sample will cause the trained bee to exhibit a proboscis extension response.

2. A method as recited in claim 1, wherein said sugar solution comprises glucose and water.

3. A method as recited in claim 2, wherein said sugar solution further comprises a biochemical supplement selected from the group consisting of: caffeine, juvenile hormone III, octopamine, protein kinase A (PKA), protein kinase C (PKC), cyclic adenosine monophosphate (cAMP), cAMP response element-binding protein (CREB), nitric oxide, and nicotine.

4. A method as recited in claim 1, wherein said background air comprises a carrier gas containing compounds from non-specific plants.

5. A method as recited in claim 1:
   wherein said background air comprises a carrier gas containing compounds from a healthy sample plant; and
   wherein said sample comprises a potentially infected sample plant.

6. A method as recited in claim 1, further comprising:
   feeding a bee a pre-training solution of water, a sugar and a biochemical supplement selected from the group consisting of: caffeine, juvenile hormone III, octopamine, protein kinase A (PKA), protein kinase C (PKC), cyclic adenosine monophosphate (cAMP), cAMP response element-binding protein (CREB), nitric oxide, and nicotine.

7. A method as recited in claim 6, wherein said biochemical supplement comprises a combination of at least two supplements selected from the group of supplements consisting of: caffeine, juvenile hormone III, octopamine, protein kinase A (PKA), protein kinase C (PKC), cyclic adenosine monophosphate (cAMP), cAMP response element-binding protein (CREB), nitric oxide, and nicotine.

8. A method as recited in claim 1, further comprising:
   verifying the training of the trained bee by exposing the bee to the selected VOC/SVOC.

9. A method as recited in claim 1, further comprising:
   verifying the training of the trained bee by exposing the bee to the selected VOC/SVOC; and
   reinforcing the training of the bee by administering a sugar reward.

10. A method of conditioning honeybees to respond to olfactory stimulus of interest, comprising:
    collecting bees for conditioning;
    feeding the collected bees a solution of water, sugar and a biochemical supplement selected from the group consisting of: caffeine, juvenile hormone III, octopamine, protein kinase A (PKA), protein kinase C (PKC), cyclic adenosine monophosphate (cAMP), cAMP response element-binding protein (CREB), nitric oxide, and nicotine;
    starving the bees;
    exposing the bees to an olfactory stimulus of interest; and
    applying a sugar solution to at least one antennae of a bee during exposure of the bee to the olfactory stimulus of interest;
    wherein a bee associates the olfactory stimulus of interest with the application of sugar reward and exhibits a proboscis extension response when exposed to the olfactory stimulus of interest.

11. A method as recited in claim 10, wherein said sugar comprises glucose and said sugar solution comprises glucose and water.

12. A method as recited in claim 11, wherein said sugar solution further comprises a biochemical supplement selected from the group consisting of: caffeine, juvenile hormone III, octopamine, protein kinase A (PKA), protein kinase C (PKC), cyclic adenosine monophosphate (cAMP), cAMP response element-binding protein (CREB), nitric oxide, and nicotine.

13. A method as recited in claim 10, wherein said biochemical supplement comprises a combination of at least two supplements selected from the group of supplements consisting of: caffeine, juvenile hormone III, octopamine, protein kinase A (PKA), protein kinase C (PKC), cyclic adenosine monophosphate (cAMP), cAMP response element-binding protein (CREB), nitric oxide, and nicotine.

14. A method as recited in claim 10, further comprising:
    repeating said exposure of the bees to an olfactory stimulus of interest and said application of a sugar solution to at least one antennae of the bee during exposure of the bee to the olfactory stimulus of interest steps more than one time.

15. A method as recited in claim 10, further comprising:
    exposing the honeybees to compounds emanating from a host-specific plant pathogen infection olfactory stimulus of interest within a carrier gas containing compounds from a uninfected host plant.

16. A method as recited in claim 10, further comprising:
verifying the training of the trained bee by exposing the bee to the selected olfactory stimulus of interest.

17. A method as recited in claim 10, further comprising:
verifying the training of the trained bee by exposing the bee to the selected olfactory stimulus of interest; and
reinforcing the training of the bee by administering a sugar reward.

18. A method for detecting agricultural volatile and semi-volatile organic compounds, the method comprising:
(a) training bees to exhibit a proboscis extension response when exposed to a selected volatile or semi-volatile organic compound (VOC/SVOC), the training comprising:
feeding collected bees a solution of water, glucose and a biochemical supplement selected from the group consisting of: caffeine, juvenile hormone III, octopamine, protein kinase A (PKA), protein kinase C (PKC), cyclic adenosine monophosphate (cAMP), cAMP response element-binding protein (CREB), nitric oxide, and nicotine;
exposing a bee to background air;
exposing the bee to the selected VOC/SVOC; and
exposing the bee to said selected VOC/SVOC while stimulating an antennae of the bee with a solution of water, glucose and a biochemical supplement selected from the group consisting of: caffeine, juvenile hormone III, octopamine, protein kinase A (PKA), protein kinase C (PKC), cyclic adenosine monophosphate (cAMP), cAMP response element-binding protein (CREB), nitric oxide, and nicotine to produce a trained bee;
(b) exposing the trained bee to a sample; and
(c) observing a response of the trained bee to the exposure of the sample;
(d) wherein the presence of the selected VOC/SVOC from the sample will cause the trained bee to exhibit a proboscis extension response.

19. A method as recited in claim 18, wherein said background air comprises compounds emanating from a host-specific plant pathogen infection, within a carrier gas containing compounds from healthy nonspecific plants.

20. A method as recited in claim 18, wherein said biochemical supplement comprises a combination of at least two supplements selected from the group of supplements consisting of: caffeine, juvenile hormone III, octopamine, protein kinase A (PKA), protein kinase C (PKC), cyclic adenosine monophosphate (cAMP), cAMP response element-binding protein (CREB), nitric oxide, and nicotine.

* * * * *